US007007007B2

(12) United States Patent
Slutz

(10) Patent No.: US 7,007,007 B2
(45) Date of Patent: *Feb. 28, 2006

(54) TEST GENERATOR FOR DATABASE MANAGEMENT SYSTEMS PROVIDING TIGHT JOINS

(75) Inventor: Donald R. Slutz, Discovery Bay, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/980,734

(22) Filed: Nov. 3, 2004

(65) Prior Publication Data
US 2005/0097118 A1 May 5, 2005

Related U.S. Application Data

(60) Continuation of application No. 10/411,911, filed on Apr. 10, 2003, now Pat. No. 6,826,558, which is a division of application No. 09/677,684, filed on Oct. 2, 2000, now Pat. No. 6,581,052, which is a continuation-in-part of application No. 09/078,837, filed on May 14, 1998, now Pat. No. 6,138,112.

(51) Int. Cl.
G06F 17/30 (2006.01)

(52) U.S. Cl. ............................................. 707/2; 707/3

(58) Field of Classification Search .................... 707/2, 707/7, 200, 100, 101, 4, 102, 3, 10, 104.1, 707/5, 103 R; 712/200; 717/169; 714/20
See application file for complete search history.

(56) References Cited

U.S. PATENT DOCUMENTS

| 5,412,806 | A | | 5/1995 | Du et al. ........................ 707/1 |
|---|---|---|---|---|
| 5,584,024 | A | | 12/1996 | Schwartz .................... 395/604 |
| 5,590,319 | A | | 12/1996 | Cohen et al. ............... 395/604 |
| 5,664,173 | A | | 9/1997 | Fast .............................. 707/4 |
| 5,692,107 | A | | 11/1997 | Simoudis et al. ............. 706/50 |
| 5,701,471 | A | | 12/1997 | Subramanyam ............. 707/200 |
| 5,724,570 | A | | 3/1998 | Zeller et al. ................. 395/603 |
| 5,732,274 | A | | 3/1998 | O'Neill .......................... 707/5 |
| 5,812,840 | A | | 9/1998 | Shwartz ......................... 707/4 |
| 5,852,818 | A | | 12/1998 | Guay et al. ..................... 707/1 |
| 5,950,188 | A | | 9/1999 | Wildermuth .................... 707/3 |
| 5,953,715 | A | | 9/1999 | Cincinatus et al. ............ 707/3 |
| 6,094,649 | A | * | 7/2000 | Bowen et al. .................. 707/3 |
| 6,138,112 | A | * | 10/2000 | Slutz ............................ 707/2 |
| 6,581,052 | B1 | * | 6/2003 | Slutz ............................ 707/2 |
| 6,631,519 | B1 | | 10/2003 | Nicholson et al. .......... 717/169 |
| 6,826,558 | B1 | * | 11/2004 | Slutz ............................ 707/2 |
| 2003/0110167 | A1 | | 6/2003 | Kim .............................. 707/4 |

* cited by examiner

Primary Examiner—Apu M. Mofiz
(74) Attorney, Agent, or Firm—Woodcock Washburn LLP

(57) ABSTRACT

A test generator produces a set of database query-language statements comprised of randomly chosen elements for testing one or more database management systems on arbitrary databases. The statements are syntactically correct according to the query language, and are semantically correct according to the query language and according to the schema of the target database. A configuration file further specifies parameters of the test statements, in terms of maximum elements, weights of different elements, etc. The generated statements include predicates in which tables in a from clause are tightly joined. In addition, a dictionary of words randomly selected from text columns in a test database is maintained and used to create predicates having words that actually appear in the row data.

18 Claims, 19 Drawing Sheets

FIG. 4A

```
** SAMPLE CONFIGURATION FILE
**
** Values shown are the defaults unless noted otherwise.
** Values in angle brackets are dummy values.
** Parameters cover SQL statement generation and execution.
** Parameter formats:
**      fxxx are binary flags with values 0 or 1.
**      cxxx are numeric.
**      Remaining forms are strings.
** Disable an entry by putting extra chars (like 'xx') in the front.
** Lines beginning with a dash describe the parameter(s) below them.
-- PROGRAM Section. Specifies global parameters
[Program]
cNumStatements=1
        - Number of statements to generate, >= 0.
cSeed=0
        - Starting seed, >= 0. 0 or Default means random value.
fExecuteSQL=0
        - Execute SQL statements if set.
fSimplifySQL=0
        - Simplify SQL that causes an error.
fCheckSum=0
        - Form checksums for output rows.
xx SQLDataSource=<PUT ODBC DSN HERE>
        - ODBC datasource to get schema from and run SQL at. If SQLDataSource is
          not specified, statements for pubs will be generated (but not executed).
SQLUser=sa
SQLPassword=
        - For SQL server, output SQL script contains 'use <database>'
          statement with this value.
SQLDatabase=pubs
SQLCatalog=pubs
        - Use for qualifier/catalog param in ODBC SQLTables call
SQLSchema=
        - Used for owner/schema param in ODBC SQLTables call
```

FIG. 4B

```
                    - Type of SQL vendor (MSS,DB2,SYB,ORA) MSS is SQL server 7.0
                    - MSS usually works for 6.5, SYB also usually works for 6.5
SQLType=MSS
                    - After each connection is made, this statements is executed first.
                    - For SQL server, it could have 'use pubs'
SQLFirstStmt=set quoted_identifier off use pubs
                    - Use a separate connection to execute each SQL statement.
                    - Default is one connection per session.
fSQLSeparateConnection=0
                    - Use only ANSI SQL (ODBC CORE plus a little bit) if set.
fANSISQL=0
                    - Obtain optimizer cost estimates and compare with measured.
fShowPlan=0
                    - Flags for debugging. You don't need them.
cTrace=0
cVerbose=0
-------------------------------------------
-- CONSOLE Section. Determines what is displayed at the console.
-------------------------------------------
[Console]
                    - Display the SQL text for each query.
fDisplaySQL=1
                    - Display the schema being used to generate statements.
                    - Columns in the database with unknown data types are ignored.
fDisplaySchema=0
                    - Display the features that can appear in SQL statements.
fDisplayAllowed=0
                    - Display data rows fetched for Select statements.
fDisplayRows=0
                    - Display statistics about execution.
fDisplayStats=0
-------------------------------------------
-- SQLFILE Section. Determines what is displayed in the report file.
-------------------------------------------
[SQLFile]
                    - Name of out file. If omitted, other entries in this section ignored.
                    - SQLFile is formatted to be suitable input script for ISQL.
```

FIG. 4C

```
FileName=SQLScript.SQL
    - Entries below are described in the Console Section.
fDisplaySQL=1
fDisplaySchema=0
fDisplayAllowed=0
-----------------------------------------------------------------
-- LIMITS Section.  Restricts size of data used and produced.
-----------------------------------------------------------------
[Limits]
cMaxCOLS=250
    - Maximum number of cols in a table. Cols beyond this number
    - are ignored when schema is read from the database.
cMaxSCHEMATABS=50
    - Maximum number of tables read from schema; others ignored.
cMaxTOTALTABLES=16
    - Max tables appearing in a query (including subqueries).
cMaxEXPRDEPTH=6
    - Max expression depth.
cMaxINLIST=6
    - Max entries in 'col IN (list)'
cMaxEXPONENT=3
    - Max digits in the exponent of a generated numeric constant.
cMaxFRACTION=99
    - Max value of fractional part of a generated numeric constant.
cMaxNumErrors=50
    - Max number of errors tolerated when SQL statements are
    - executed. If limit reached, Rags will stop.
cMaxRowsDisplayed=5
    - Maximum number of rows displayed for each query, >=0.
cMaxRowsFetched=200
    - Maximum number of rows Fetched for each query, >=0.
    - (Any additional rows are counted, but not displayed)
cMaxOUTLINELENGTH=72
    - Line size of console and SQLfile output records.
-----------------------------------------------------------------
-- ALLOWED Section.  Features allowed in SQL statements.
-----------------------------------------------------------------
```

FIG. 4D

- Weights (cWTG_...) determine percent of time feature is used.
- Weight values should be in {0,1,2,...,100}.
- Other c... params are max values of generated items.
- Program picks uniformly over {1,...,max} if max >=1.

[Allowed]
cSelList=8
    - Max number of entries in the Select list, >=1.
cJoinTables=3
    - Max number of tables in a Join, >=1.
cWTG_WHERE=90
    - Percent of Selects with a WHERE clause
cGroupByCols=3
    - Max number of Group by cols, >=0. 0 means no group by.
cWTG_GROUPBY=25
    - Percent of Selects with GROUP BY clause (if cGroupByCols>0)
cWTG_GROUPBYEXPR=25
    - Percent of Group By list that are expressions, not just cols.
cWTG_ALLFUNCTIONS=5
    - Percent of Selects with only aggregate functions in select
      list, and no GROUP BY (eg, select avg(sal) from emp)
cWTG_HAVING=33
    - Percent of Selects (not subqueries) with a HAVING clause,
      given that they have a GROUP BY clause.
cWTG_HavingWOGroupby=20
    - Percent of AllFunctions (no GroupBy) with Having
cWTG_HavingInSubqueries=50
    - Percent Having in subqueries (given there is grouping).
cOrderByCols=5
    - Max number of Order by cols, >=0. 0 means no order by.
cWTG_ORDERBY=25
    - Percent of Selects with ORDER BY clause, if cOrderByCols>0
cWTG_ORDERBYEXPR=25
    - Percent of Order By list that are expressions, not just cols.
cSubQueryDepth=4
    - Max depth of subqueries, >=0. (0 means no subqueries)
    - Percent of relational predicates that contain a subquery
      (eg, col > Select ...)

FIG. 4E

```
cWTG_SUBQUERY=25
    - Percent of relational predicates with a subquery that also
    - have a modifier (eg, col > SOME Select ...)
cWTG_SUBQUERYMOD=90
    - Allow DISTINCT in select list (Select DISTINCT ....)
cWTG_SELDISTINCT=25
    - Allow DISTINCT in aggregate functions (count(DISTINCT ..))
cWTG_DISTINCTFN=10
    - Percent of column references to tables in outer queries.
cWTG_USEGLOBALCOL=10
    - Allow aggregate functions in a query.
fLocalFunctions=1
    - Allow IS [NOT] NULL to be used in expressions.
fNulls=1
    - Percent of numeric unary expressions that have a scalar
    - function; otherwise they have a minus sign.
cWTG_USENUMSCLR=20
    - Percent of numeric literals with a fractional part (2.234)
cWTG_CONSNUMFRAC=25
    - Percent of numeric literals with an exponent (2 E-12)
cWTG_CONSNUMEXP=5
    - Percent of aggregate functions that are COUNT(*)
cWTG_COUNTSTAR=10
    - Max size of N in Select ... TOP N ...
cTopValue=10
    - Percent of Selects with TOP N
    - (Need TOP in subqueries to allow Order by)
cWTG_TOP=50

-----
    - Percents below determine what fraction of all statements are of the
    - designated type. The remainder are Select statements. If the percents
    - for other statements add up to > 100, the program produces an error.
-----
    - Percent of Statements that are Updates
cWTG_UPDATE=0
    - Percent of Statements that are Inserts
cWTG_INSERT=0
```

FIG. 4F

```
cWTG_DELETE=0
        - Percent of Statements that are Deletes
cWTG_CREATEINDEX=0
        - Percent of Statements that are Create Index
        - Percent of Statements that are Drop Index. (Only indexes created in the
          run may be dropped. If no such indexes exist, a Select statement will be
          generated).
cWTG_DROPINDEX=0
        - Max number of columns in an index (> 0).
cIndexCols=4
        - Percent of created indexes that are unique
cWTG_CreateIndex_Unique=20
        - Percent of created indexes that are clustered
cWTG_CreateIndex_Clustered=10
        - Percent of Inserted values that are defaults
cWTG_INSDEFAULT=10
        - Percent of Updates and Inserts with MS FROM extension
cWTG_FROMEXT=50
        - Allow Unicode data types
fUnicode=0
        - Max statements per transaction (not including Commit/Rollback).
        - 0 means Auto Commit.
cTransactions=0
        - Percent of transactions committed (not rolled back)
cWTG_COMMIT=0
        - Limit ASCII chars in string constants to allow common sort order.
        - Don't generate string constants of zero length.
fLimitChars=0
        - Fetch int, smallint into floats for ANSI comparisons.
        - Add '1.0*' to divisors to force float expression.
fLimitNums=0
        - Include Select getdate(), statement number, and seed with each statement.
fStmtHeader=1
        - Limit statement features to those auto parameterized.
fAutoParam=0
```

| ELEMENT | MEANING |
|---|---|
| DataType | Data type this expression must be. |
| fLocalFunctions | Allow aggregate functions over local columns. |
| fGlobalFunctions | Allow aggregate functions over global columns. |
| fAllFunctions | All local column references must be within aggregate functions. The query does not have a GROUP BY clause. |
| fMake1GlobalCol | Must generate exactly one bound global column reference. |
| fMakeLocalCol | Must generate one or more bound local columns. |
| fMakeSomeCol | Must generate at least one global or local column. |
| fMakeConstant | Use only constants; do not generate any column references. |
| fMake1Row | Query must not return more than one row. |
| fNoBareCol | Do not make an expression that is just one free column reference or just one numeric constant |
| AvailCols[DataTypes] | An array indicating, for each data type, whether local and global, free and bound columns exist. |
| OptRules[DataTypes] | An array indicating, for each data type, whether a local and/or a global function can be used (that is, a suitable column exists and the function is allowed). |
| GoodDataTypes[] | An array indicating what data types can be supported because at least one column of that type exists. |
| cLevel | Depth of this expression. Used to limit expression depth. |
| fInFunction | This expression is inside an aggregate function. Used to prevent nesting of aggregate functions. |
| fOnlyInts | In numeric constants, do not generate a fractional part. Used to generate indexes in ORDER BY list. |
| *pBareCol | Pointer to name of column if this expression is just a single column reference (returned). Used to prevent duplicate entries in ORDER BY list. |
| iPNode | Index of parse tree node that is root of this expression (returned). Used when parse tree is built to simplify a statement. |

The types of column references are:
- Local Column: A column from a table referenced in the current query.
- Global Column: A correlated column from a table referenced in an outer query.
- Free Column. A column reference that is not contained within an aggregate function.
- Bound Column. A column reference within an aggregate function.

FIG. 7

```
SELECT TOP 2 '6o' ,    ((-1 )%(-(-(T1.qty )))/(-(-2 )),  (2 )+(T0.min_lvl ),'_^p:'
FROM jobs T0, sales T1
WHERE ( ( (T0.job_id ) IS NOT NULL ) OR (('Feb 24 7014 10:47pm' )= (
SELECT DISTINCT 'Jun  2 5147  6:17am'
FROM employee T2, titleauthor T3, jobs T4
WHERE ( T2.job_lvl  BETWEEN  (3 ) AND (((-(T4.max_lvl ))%((3 )-(
-5 ))-(((-1 )7(T4.job_id ))%((3 )%(4 )))) ) OR (EXISTS (
SELECT DISTINCT TOP 7  MIN(LTRIM('Hqz6=14I' )),   LOWER( MIN(T5.country )),
MAX(REVERSE((LTRIM(REVERSE(T5.city ))+ LOWER('Iirl' ))),  MIN(T5.city )
FROM publishers T5
WHERE EXISTS (
SELECT (T6.country +T6.country ),  'rW' , LTRIM( MIN(T6.pub_id ))
FROM publishers T6, roysched T7
WHERE ( ( NOT (NOT (('2NPTd7s' ) IN ((LTRIM('DYQ=a' )+'4Jk' )A3oB' ), (
'xfWU' +'Li6J:0-b' ), 'QXD6_Os' , ( LOWER('B)^TKI'b' )+(' '+'V;K2' )),
'min?' , 'v1=Jp2b@' )) ) ) AND (( EXISTS (
SELECT TOP 10 T9.job_desc ,  -(-(T9.max_lvl )),  '?(t\UGMNm'
FROM authors T8, jobs T9, authors T10
WHERE ( (T10.zip ) IS NULL ) OR (-((7 )%(-(1 ))) BETWEEN (-(((T9.job_id
)*(-3.0 ))+(T9.min_lvl ))) AND (T9.min_lvl ) ) )
) AND (NOT (( (T7.hirange ) IN (T7.hirange , -(T7.hirange ))-(T7.royalty )),
0 ), 1 ,  -(((-(-(T7.hirange )))/(-(T7.hirange ))-(T7.hirange ))-(T7.royalty )),
T7.lorange )) OR ((-2.0 )< ALL (
```

```
SELECT DISTINCT T8.hirange
FROM roysched T8, stores T9, stores T10
WHERE ( ( ( 1 )+((T8.royalty )%(-3 )) BETWEEN ((T8.hirange )*((T8.hirange
)/(-4 ))) AND (T8.hirange ) ) OR (NOT (( (T8.royalty )-T8.hirange ) OR ((
T8.hirange )< T8.lorange ) ) ) ) AND (T9.stor_id BETWEEN (RTRIM(
T8.title_id )) AND ('?' ) ) )
 ) ) ) ) AND ((( RADIANS(T7.royalty ))/(-3 ))=-2.)
GROUP BY -(-((T7.lorange )+(T7.lorange )), T7.hirange, T6.country
HAVING -(COUNT (((1 )*(4 ))) BETWEEN (T7.hirange ) AND (-1.0 ) ) ) ))
) AND (EXISTS (
SELECT DISTINCT TOP 1 T1.ord_date , 'Jul 15 4792  4:16am'
FROM discounts T2, discounts T3
WHERE (T1.ord_date ) IN ('Apr 1 6681  1:42am' , 'Jul 10 5558  1:55Am'
T1.ord_date )
ORDER BY 2, 1 ) ) )
```

```
SELECT TOP 2 '60',-(-2), T0.min_lvl,' ^p: ' _ , 'Jul 15 4792 4:16am'
FROM jobs T0, sales T1
WHERE EXISTS (
    SELECT DISTINCT TOP 1 T1.ord_date
    FROM discounts T2, discounts T3
ORDER BY 2,1)
```

FIG. 11

TABLE SETS

| | | | | |
|---|---|---|---|---|
| T1 | T2 | T3 | T4 | T5 | ⎬ 1304.0
| T1 | T2 | T3, T5 | T4 | | ⎬ 1304.1
| T1, T4 | T2 | T3, T5 | | | ⎬ 1304.2
| T1, T4 | T2, T3, T5 | | | | ⎬ 1304.3
| T1, T2, T3, T4, T5 | | | | | ⎬ 1304.4

Select *
From T1, T2, T3, T4, T5
Where T1.a > T1.b or T2.a + T3.c < 7/5.1      1302.0

Select *
From T1, T2, T3, T4, T5
Where (T1.a > T1.b or T2.a + T3.c < 7/5.1) AND
T3.c = T5.c      1302.1

Select *
From T1, T2, T3, T4, T5
Where (T1.a > T1.b or T2.a + T3.c < 7/5.1) AND
T3.c = T5.c AND T1.d = T4.d      1302.2

Select *
From T1, T2, T3, T4, T5
Where (T1.a > T1.b or T2.a + T3.c < 7/5.1) AND
T3.c = T5.c AND T1.d = T4.d AND
T2.c = T5.c      1302.3

Select *
From T1, T2, T3, T4, T5
Where (T1.a > T1.b or T2.a + T3.c < 7/5.1) AND
T3.c = T5.c AND T1.d = T4.d AND
T2.c = T5.c AND T4.e = T5.e      1302.4

FIG. 13

TEST GENERATOR FOR DATABASE MANAGEMENT SYSTEMS PROVIDING TIGHT JOINS

CROSS-REFERENCE TO RELATED APPLICATIONS

This application is a continuation of U.S. patent application Ser. No. 10/411,911 filed Apr. 10, 2003 now U.S. Pat. No. 6,826,558, entitled "TEST GENERATOR FOR DATABASE MANAGEMENT SYSTEMS PROVIDING TIGHT JOINS, which is a divisional of U.S. patent application Ser. No. 09/677,684 filed Oct. 2, 2000 now U.S. Pat. No. 6,581,052, which is a continuation in part of U.S. patent application Ser. No. 09/078,837 filed May 14, 1998; "TEST GENERATOR FOR DATABASE MANAGEMENT SYSTEMS", now U.S. Pat. No. 6,138,112, which are hereby incorporated by reference herein in their entirety.

FIELD

The present invention relates to electronic data processing, and more specifically concerns automated testing of database management systems using statements having a tight join of a plurality of tables.

BACKGROUND

Relational database management systems (DBMS), such as Microsoft SQL Server, interpret statements written in a database query language such as Structured Query Language (SQL) to create and manage database objects, to insert and update data, and to perform complex, multilevel queries against huge amounts of data. Testing these systems is recognized throughout the industry as a technical challenge of the first magnitude. SQL and similar database-system interpreters are highly complex. For example, they offer sophisticated optimization techniques and execution planning for queries input on the fly; opportunities for arcane design problems are ubiquitous. At the same time, the state space to be tested is gigantic. For a one-gigabyte database, the possible combinations of database configuration and SQL statement to be executed exceeds $10^{2,000,000,000}$.

Libraries of test scripts for relational database systems typically contain thousands or tens of thousands of sample statements which are applied to a test database for comparison of their results with known correct data. Existing libraries are known to be inadequate; most commercial database systems produce a constant and substantial stream of reported bugs. However, the amount of work required to generate larger libraries quickly becomes prohibitive.

At the rate of a half hour per hand-written test statement, even a small library consumes more time than does the design of the system that it tests.

In the past, developers have employed some stochastic testing at the language level to accelerate database testing. For example, a test-case generator may choose a random mix of hand-generated fixed scripts. Choosing random parameter values in fixed scripts increases the effective number of test cases. These methods still require painstaking human composition and verification of long, multilevel queries. Automated generation of very simple queries considerably speeds up the generation of test cases, but eliminates the more complex test cases where subtle errors lurk.

In addition, conventional test systems are effectively limited to a fixed database, or to simple variations on fixed data. In order to construct statements that actually execute properly against the target database, the test system must be internally coded to produce only those statements that match the semantics of the database, the names of the database tables and their columns, the particular data types of each column, and so forth. However, testing on only one set of data obviously restricts the range of the tests that can be performed and thus the errors that will be uncovered. In addition, the use of fixed data for many tests does not permit slanting test runs toward certain kinds of applications, or focusing on the kinds of data or database structures that have been found to produce errors.

Also, the length and intricacy of test statements, although desirable for teasing out subtle errors, works against the isolation of bugs which cause those errors. Short, simple statements that produce errors are much more useful for tracking the errors down to particular parts of the DBMS under test.

In addition, automatically generating test SQL statements in a random manner has two practical shortcomings. First, when a test SQL statement refers to data in multiple SQL tables, the set of result rows often includes all combinations of data from rows in the tables in the From clause. This is called a Cartesian product of the tables. As a result, the number of output rows is the product of the sizes of the queried tables, which can impose artificial limits in the sizes of tables in the test database.

A second shortcoming results from the use of randomly generated character string constants. Some SQL database systems support special searching of large text objects. For example, the text objects might be newspaper articles and the search predicate would specify articles that contained two particular phrases "near" each other. 'Near could mean anywhere in the same paragraph. Unlike regular character string predicates involving equal, not equal, greater than, etc, the text predicates concentrate on finding words or strings that are in the text. Generating character strings constants with randomly selected characters almost always yields tokens that are not found in the text string. This reduces the effectiveness of random testing since some code paths will not be tested much.

The prior art is this field has not satisfied a longstanding need for fast generation and execution of complex test statements for sophisticated database systems that accurately model results sets used in real world applications.

SUMMARY

The present invention speeds up the generation of database test cases by orders of magnitude. A typical generator running on a personal computer having a single 200 MHz microprocessor outputs 700 SQL statements per second, about a million times faster than a human. The queries are complex and can have multiple nested levels. They have valid semantics as well as valid syntax; that is, they will run correctly on a bug-free database system, using whatever sample database is selected for a test run. The statistical and other features of the test cases are configurable. A test operator may choose the syntactic elements selectable in queries or other statements, the frequency of their use, and parameters such as the maximum subquery depth.

Briefly, the invention achieves these and other objectives by reading configuration data containing a set of test parameters, reading the schema of an arbitrary database, then constructing a number of test statements that are syntactically correct for the DBMS being tested, that are semantically compatible with the target database, and that have content and characteristics pursuant to the configuration data. One or more DBMSs under test execute the statements and return result data. Execution errors are detected, as well as result-data differences. Error-producing statements can be converted into greatly simplified statements that provoke the same error, in order to facilitate fault isolation.

Generated SQL statements include predicates that are tightly joined in order to avoid results sets that comprise the Cartesian product of the data in the tables. In one aspect of the test system, a From list contains N tables. A list of N sets of table names is then created. Initially, each table set contains one table name from the From list. With each iteration, pairs of table sets are uniformly selected, and a table is uniformly selected from each table set. A column from each selected table is chosen and a predicate equating, or otherwise relating, the two columns is ANDed into the Where clause. The two selected table sets are merged into one, and the two selected table sets are then removed. The process iterates until a single table set remains.

A further aspect of the system is that text strings to be included in predicates can be selected from a dictionary. The dictionary is created by sampling the text columns in the target database and extracting a random collection of actual words to place in the dictionary. Words from the dictionary can be randomly interspersed with randomly generated words to form argument values for the full text predicates. The fraction of dictionary words used compared to randomly generated words can be a configuration parameter of the automated SQL testing tool. A separate dictionary is built for each text column in the database. The number of words, to be placed in the dictionary can be a configuration parameter (specified either as a constant or as a percentage of the total number of bytes in the text column).

Other features and advantages of the invention, as well as modifications within the scope of the invention, will occur to those having routine skill in the art from the following detailed description, taken in conjunction with the accompanying drawing.

BRIEF DESCRIPTION OF THE DRAWINGS

FIG. 4, comprising FIGS. 4A–4F, shows a configuration file used in the process of FIG. 3

FIG. 7 illustrates a state-information file for use in conjunction with an implementation of FIG. 6.

FIG. 9, comprising FIGS. 9A–9B, illustrates a more typically complex test statement produced by the process of FIG. 6.

FIG. 11 shows a simplified version of the statement of FIG. 8 produced by the process of FIG. 9.

FIG. 13 provides an exemplary application of the process illustrated in FIG. 12.

DETAILED DESCRIPTION

Figure 1:
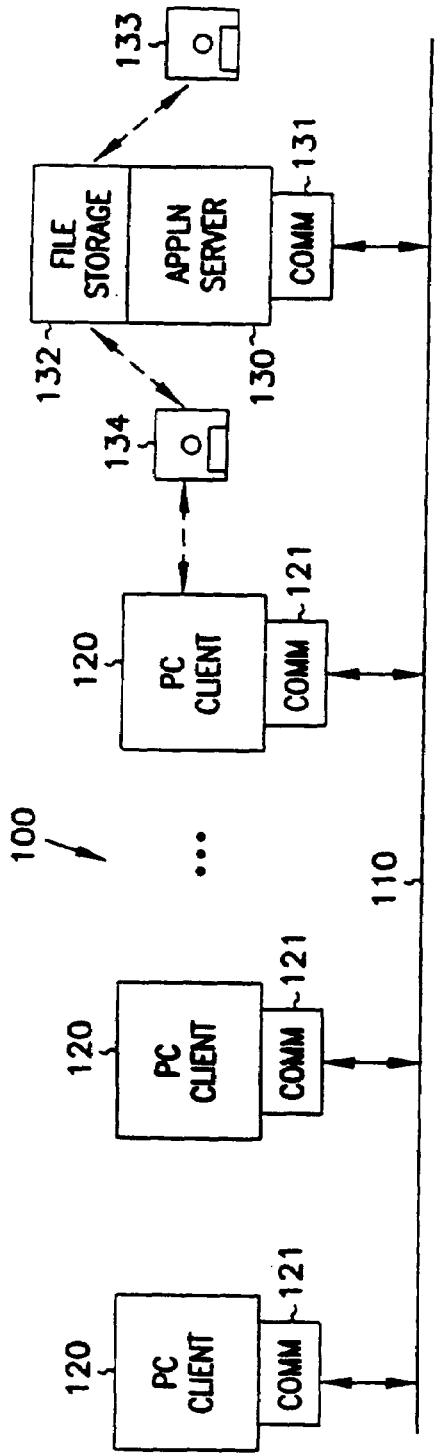
FIG. 1 is a block diagram of an environment in which the invention can be practiced.

FIG. 1 is a high-level block diagram of a conventional client/server computer system 100. Network wiring 110 interconnects a number of personal computers (PCs) 120 to a server 130 via network adapters 121 and 131. Server 130 includes a storage subsystem 132 for holding the large amounts of data in typical enterprise databases. Other system architectures are also suitable environments for the invention; for example, units 120 may be terminals connected to a mainframe or midrange computer 130, or unit 130 may itself comprise a PC coupled to PCs 120 in a peer-to-peer network. For small databases, the entire system 100 may comprise a single PC acting as both client and server. Likewise, file storage may be distributed among a number of different machines. Furthermore, the system can be implemented as a three tier or a multi-tier system. FIG. 1 includes a schematic representations of an external storage medium 133 which may store client and server software for distribution and downloading to clients, and another medium 134, such as a diskette, for offline storage of database tables. Medium 134 can also store instructions and data for the test program of the present invention; the test program can be executed in one or more of the clients 120, or even in server 130.

Figure 2:
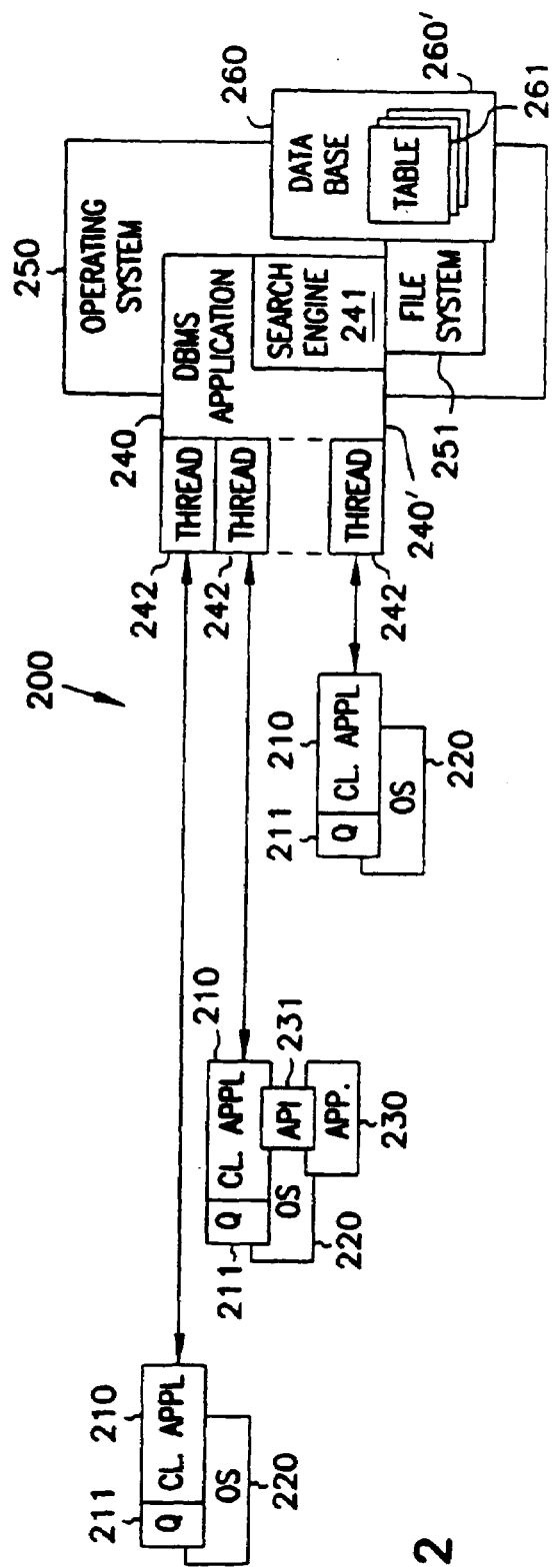
FIG. 2 is a block diagram of an illustrative database system to be tested by the invention.

FIG. 2 is a block diagram of a typical conventional client/server database management system 200 capable of operating in system 100, FIG. 2. A client application program 210 executes within each PC 120, under a PC operating system 220 such as a version of the Microsoft Windows operating system, including Windows 95®, Windows 98®, Windows Me®, Windows NT®, or Windows 2000®. Among other functions, client application 210 contains a facility 211 for accepting database queries from a user at a PC 120. In addition to user entries, other application programs 230 executing in some of the PCs 120 may present queries to DBMS client 210, via predefined host-language application-program interfaces (APIs) 231. One of these programs can be the test program of the invention.

Within server 130, a DBMS server application 240, such as Microsoft SQL Server, executes under a server operating system 250 such as Microsoft NT. DBMS program 240 provides services for creating, maintaining, and modifying a number of relational databases, exemplified by database 260. Program 240 may employ the file-system services 251 of operating system 250, or may provide its own file system. Operating system 250 could execute a separate instance of the entire DBMS application for each request from a client 210. For greater efficiency, however, program 240 gives each client connection a separate thread 242 in the DBMS kernel. Further, this thread is a native operating-system thread, which carries with it all the Windows NT mechanisms for process memory protection, better access to storage devices, and so forth. Search engine 241 processes queries from individual clients 210 upon tables 261 of a database 260, as described more fully below. It also enforces database integrity with conventional facilities for record locking, atomic transactions, etc. In the Microsoft SQL Server, the interface language between query facility 211 and search engine 241 is Transact-SQL, which provides much of the function of the standard ANSI SQL, 89 and ANSI SQL 92 languages, plus extensions for providing greater flexibility and programmability.

The test program may execute query-language statements upon multiple systems, either concurrently or sequentially. In order to differentiate between them, the reference numeral 240' indicates a second DBMS, which manages the same database 260 as the first system 240 (either at different times or, for some DBMSs, concurrently), or a different database, indicated as 260'.

Figure 3:
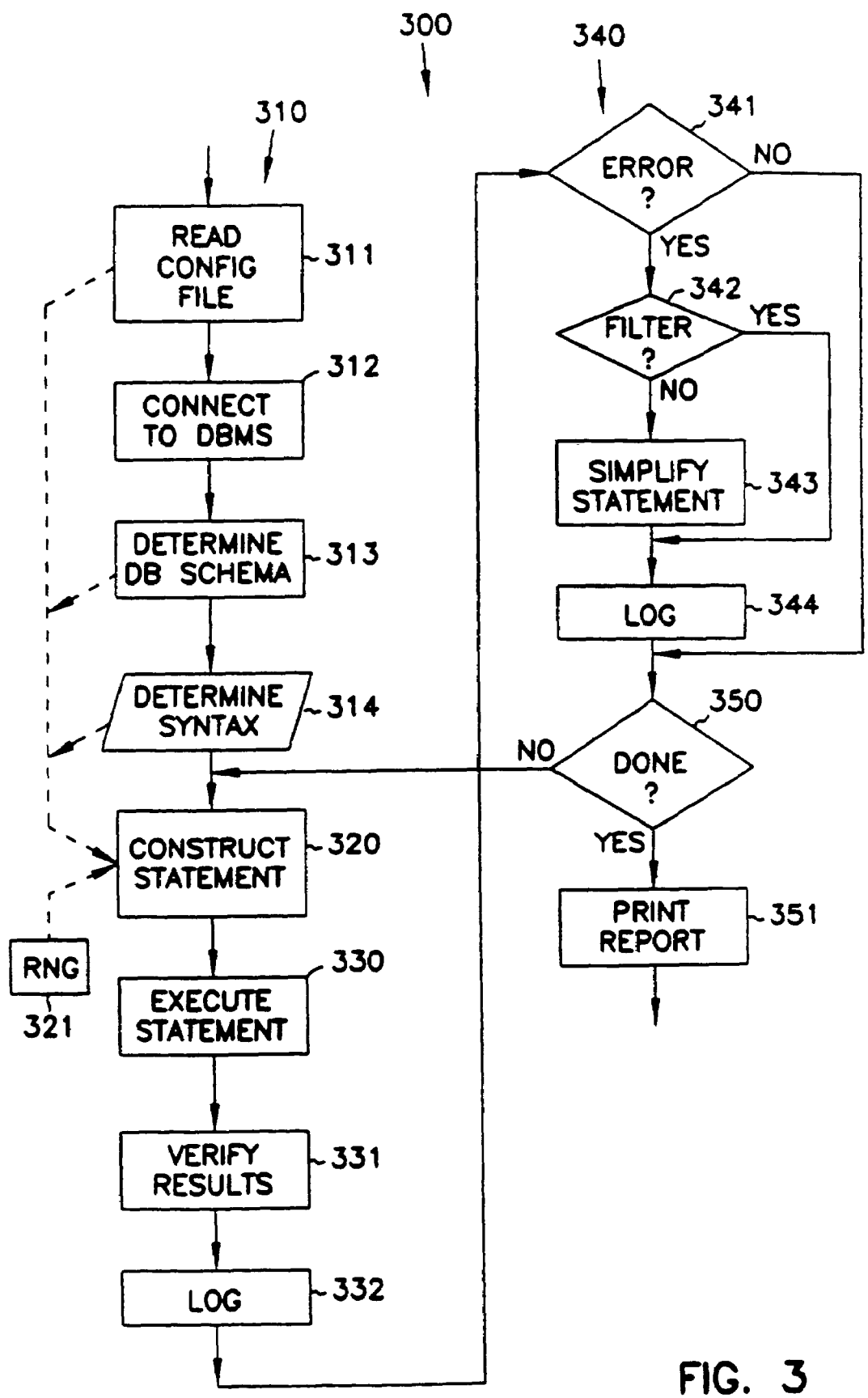
FIG. 3 is a flow diagram for a test generator according to the invention.

FIG. 3 shows the overall flow of a test generator 300 for producing massive numbers of statements for testing DBMS applications 240 according to the invention. Test program 300 can reside in one of the PC clients 120, FIG. 1, where it may simulate a user; alternatively, it can execute within server 130, or at any other convenient location. Testing a DBMS in this context concerns checking the correctness of its implementation of the language by which it interfaces between databases and users of the databases. These languages are generally referred to as query languages, even though their statements perform in any functions other than querying data in tables; for example, statements can create and modify data tables, insert and modify table data, define transactions for committing data, manage database security, and compile performance statistics. Likewise, the term "query" is usually used as a synecdoche for any statement in an interface language. This embodiment assumes the use of SQL (Structured Query Language), which is actually a family of more or less standardized dialects in common use. Any of these dialects will serve the present purposes. Other query languages such as QBE (Query by Example") can be substituted easily. Every query language has an explicit syntax specification that defines how to construct valid statements in the language. One aspect of testing the DBMS involves determining whether a statement that is well-formed according to the syntax of the query language does in fact execute without error in the tested DBMS (or, more generally, whether the DBMS reports the proper error status of any statement given to it). Another aspect involves verifying that the results (or lack of results) that a statement produces in that test database are correct. The present embodiment can perform both of these tests.

Preliminary blocks 310 begin the entire testing process. Block 311 reads in a configuration file 400 containing a set of parameters for the test procedure. One of the parameters specifies the name of a database 260 to provide the data tables 261. That is, the process is not limited to one or more fixed databases for testing a DBMS, but can employ arbitrary, user-selected target databases. Another parameter is able to specify the name of a different DBMS as a verification DBMS for checking the correctness of returned results. Other parameters of the configuration file will be described below.

Block 312 connects test program 300 to test DBMS 240 using the standard Open Database Connection (ODBC) protocol or any other conventional method. Block 313 determines the schema of the test database 240. The schema of a database is the organization of its data. Schemata for relational databases include the names of all data tables, the names, positions, and data types of table columns, restrictions on null or duplicate data values, and so forth. The test-database schema may be derived from any convenient source; it could, for example, be stored in the configuration file. Block 314 symbolizes the syntax specification of DBMS 240. In this implementation, the syntax is built into the code that constructs statements, rather than read in from an external source.

Block 320 constructs each statement to be used in the testing process as a parse tree by following the syntax specification of block 313. At each element of the syntax diagram, block 320 inserts a syntactic element which comports with the test-database schema read by block 314. The selection of one of a number of grammatically correct elements is made by a random roll from a seed, guided by probability parameters contained in the configuration file from block 311. The configuration file can, in fact, specify that only certain features, certain syntactical constructs, or certain parts of the database be included in the statements. Actually, block 320 produces statements using a pseudo-random number generator 321, so that the same configuration settings, the same schema, and the same starting seed cause it to produce the same statement deterministically; this allows regression testing of the DBMS. Although one could save the sequence of generated statements for regression testing, the advantage here is that saving only the starting seed can reproduce the entire sequence later. In addition, block 320 follows a set of internal rules that further permit or constrain certain choices at certain points in the parse tree.

Block 330 causes test DBMS 240 to execute the statement against database 260. If the configuration file had specified verification testing, then block 330' causes verification DBMS 240' to execute the same statement against the database. Each execution may or may not produce a set of data (for a query) or other results from the database. Verify block 331 compares the result sets produced by multiple executions, and produces a verify-error indication if they are not the same. Although the results could be compared in detail, a simpler check usually suffices; for example, block 331 can compare the number of affected rows for a data-modification statement. Block 331 can count the rows in the result sets of a query statement, then generate and compare checksums over the column values in all the rows; this avoids having to sort the result data and compare it one unit at a time. To avoid precision errors, the configuration file can specify a round-off tolerance for numeric fields. Date/time fields are more problematic, because the same value might assume different valid forms; a configuration parameter can specify a common format, or can specify that these fields are not to participate in comparisons.

Block 330 also produces an operational error indication when test DBMS 260 fails to execute the statement properly. Besides execution errors (usually including query-language compiler errors) reported by the DBMS, operational errors include lost connections to the database, deadlocks, and system crashes. If a DBMS connection is lost, program 300 attempts to reconnect; if this attempt fails, the program aborts the test run. A system crash requires an automated rapid restart of the server in order to continue the run.

Block 332 logs each executed statement, its result data, and any error indications, along with the seed value for each statement. If verification is not being done for the test, logging this data allows the test to be run again at a later time in a pseudo-verification mode with the same DBMS 240, using logged data from the previous run for comparison. This mode is useful for catching suspected intermittent errors.

Blocks 340 process data and operational errors resulting from the execution of a statement. If no error occurs, block 341 passes control directly to loop control 350. The extremely long test runs generated by program 300 can result in huge error files of 'uninteresting' errors. An uninteresting error is one that is expected to naturally occur in a randomly generated statement. For example, divide-by-zero and overflow errors are uninteresting. Therefore, block 342 filters some of these from the log, or merely counts their occurrences. Additionally, some errors tend to occur in large numbers when they occur at all. For this situation, a configuration-file parameter specifies certain error codes to count or to ignore entirely.

Block 343 simplifies statements which have produced errors. Debugging a complex non-procedural program such as a DBMS is greatly facilitated by modifying failed statements to produce simpler versions that still produce the same error. Simplification is particularly advantageous for the long, complex statements produced by program 300. Simplification proceeds by sequentially removing as many elements of the statements as possible while preserving the same error indication. The simplified statement is usually not equivalent to the original statement which means it would not return the same result set had no error in the system occurred. Although one bug might cause a certain error indication in the original statement and a different bug in the simplified one; this has been found to be extremely unlikely. Block 344 records the simplified statement and keys it to the original.

Block 350 passes control back to block 320 to generate another statement as long as the test run has not completed. Completion conditions are read from the configuration file. Any convenient measure, such as number of statements, number of errors, and run time, are possible. Block 351 draws up a report of the entire test run. The report can include conventional items such as error listings and statistics concerning the different types of features included in the test statements, or reduced summaries of such items. The report also optionally lists the schema of the test database and the current configuration-file settings. For the pseudo-verify mode described above, it is also useful to include machine readable information on each statement, its result data, and error indications. Program 300 can then run these same statements against the test database on the same test DBMS at a later time, and compare the two runs. Also, a conventional utility program can combine and summarize the results of multiple test runs carried out concurrently on different data processors.

This embodiment of program 300 generates and executes an entire suite of test statements in a single run. It is entirely possible, of course, to generate all the test statements in a batch, then to run those statements from a file at a later time. For example, program 300 could execute blocks 310, then loop on block 320 until all statements have been completed. Then a later run could loop on blocks 330–340, and print the report of block 351.

FIG. 4 shows a portion of a configuration file 400 containing about a hundred parameters that program 300 employs to control a test run. The format is similar to that of a conventional .INI file for specifying parameters and data to a program. Each line names a parameter and gives it value; comment lines begin with asterisks or dashes. A Program section specifies global parameters controlling the overall operation of a test run, including the database schema of block 313. The parameter fSimplifySQL determines whether or not to auto-simplify faulty statements. A Console section controls data display for real-time tracking of a test run. An SQL file section configures the report file of block 351. A Limits section specifies bounds on database size, overall statement size, subquery depth, number, and so forth. An Allowed section controls the type and content of statements generated by block 320. For example, cSelList:=8 ensures no more than eight output columns in any generated SELECT statement. Many of the parameters occur in pairs naming a maximum and a frequency for statement features or constructs. For example, cGroupBy-Cols=3 and cWTG_GROUPBY=25 specify that no statement has more than three columns in a GROUP BY clause, and that 25% of all statements shall include a GROUP BY clause. A group of parameters near the end of this section specify the mix of different statement types, such as UPDATE, INSERT, DELETE, and SELECT. Parameters such as fUnicode=0 toggle on or off the use of certain data types in generated statements. Frequently, discrepancies arise in block 331 of FIG. 3 because different DBMSs will return the same result data values but in different data types; data-type translation solves such problems without restricting the domain of generated statements. Because transactional integrity is an important aspect of DBMS operation, other parameters control the use of multi-statement transactions and methods, COMMIT and ROLLBACK, to end the transactions. Configuration file 400 not only permits the testing of different systems and databases, but also greatly facilitates the isolation of system bugs. That is, particular features and statement characteristics that produce problems can be emphasized merely by changing a few parameters in the file.

Program 300 builds statements in response to parameters from the configuration file, to database structure from the schema, and to the syntax of the query language. Query-language syntax is usually written as a set of productions in a stylized script or diagram format such as Backus normal form. A syntactically valid statement is conceptually constructed by expanding the productions, choosing only one of the allowable paths at every node where the syntax permits alternatives. In this embodiment, individual procedures build major productions such as WHERE and GROUP BY; the smaller productions, such as picking operators in an expression, employ simple case statements.

Figure 5:
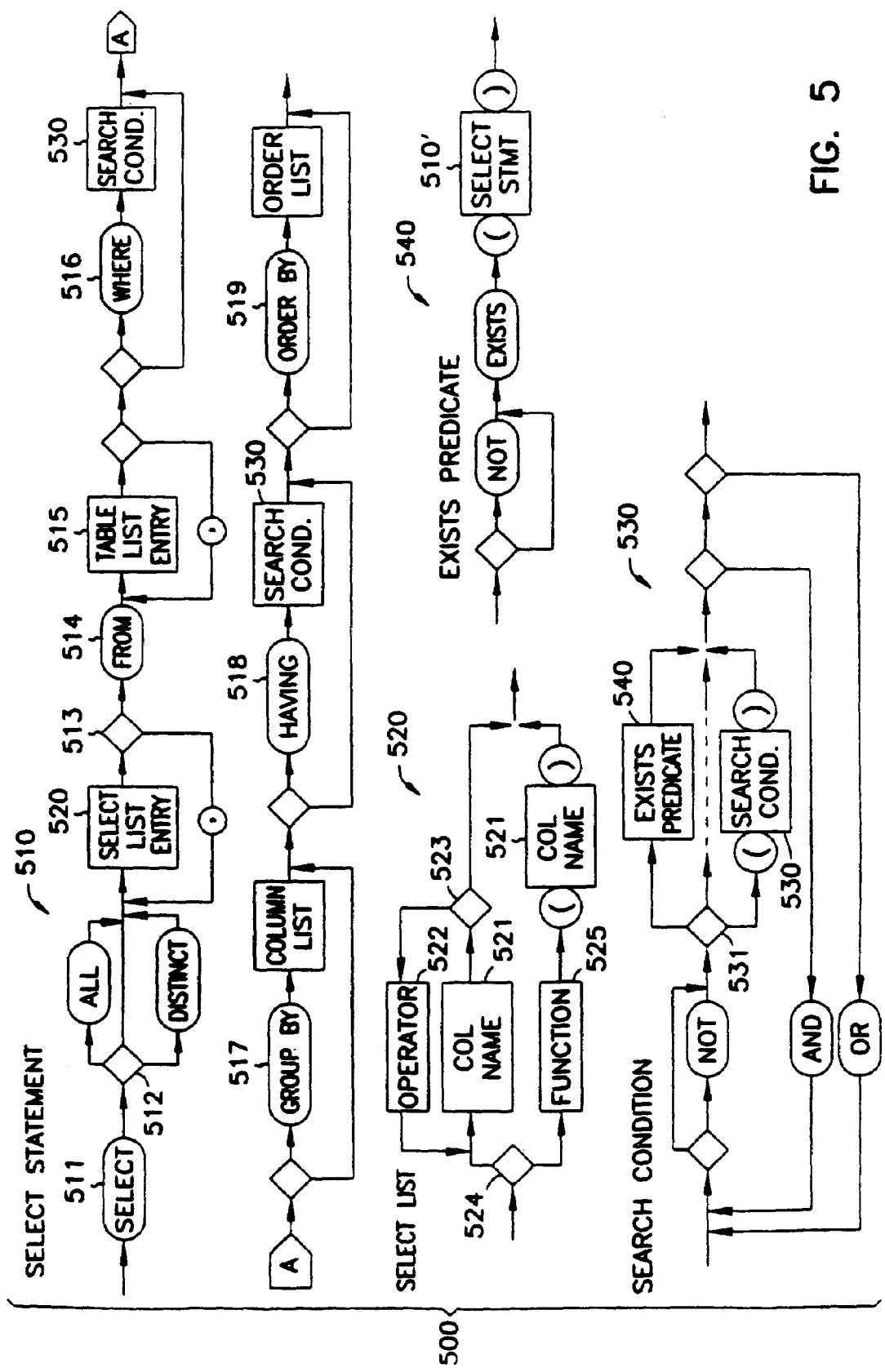
FIG. 5 shows an example of a syntax diagram used for constructing a statement in FIG. 3.

Some of the alternatives can involve repetitions and/or recursive calls. As an illustration of a syntax specification, FIG. 5 shows a partial set of productions 500 for a SELECT statement in a simplified dialect of SQL. The name of each production is printed above its diagram. Rectangular boxes indicate other productions. Rounds and ovals indicate terminal syntactic elements. Small diamonds indicate points at which alternative paths exist.

In Select Statement production 510, for instance, block 511 requires that a SELECT statement begin with the word "SELECT", which can be optionally followed by a qualifier word "ALL" or "DISTINCT" at point 512. Then a Select List Entry 520 can be repeated zero or more times at node 513, separated by commas. Production 520 for a Select List Entry comprises either one or more Column Name syntactic elements 521 separated by Operator elements 522 at choice point 523. Alternatively, point 524 can specify a Function name 525 followed by a parenthesized Column Name 521.

The final exit from node 513 following the last Select List expansion requires a "FROM" keyword terminal 514 followed by a Table List Entry 515; the production for this element includes table names, JOIN operators having ON clauses, and other elements, not shown. The other major parts of a SELECT statement are the optional WHERE clause 516, GROUP BY clause 517, HAVING clause 518, and ORDER BY clause 519. Both clauses 516 and 518 include a Search Condition predicate 530. Production 530 illustrates another aspect found in most syntax specifications; a production may include itself as an element, as shown by parenthesized block 530. Among the numerous elements available al: node 531 is an Exists Predicate 540. Production 540 reveals that one of the elements of this predicate is a Select Statement production 510. That is, an entire SELECT statement can be nested inside another SELECT statement; such a nested occurrence is referred to as a subquery, and its containing query or subquery is called an outer query. A column C belonging to a table in an outer query can be referenced in a subquery. The reference to C in the subquery is called a correlated reference.

Figure 6:
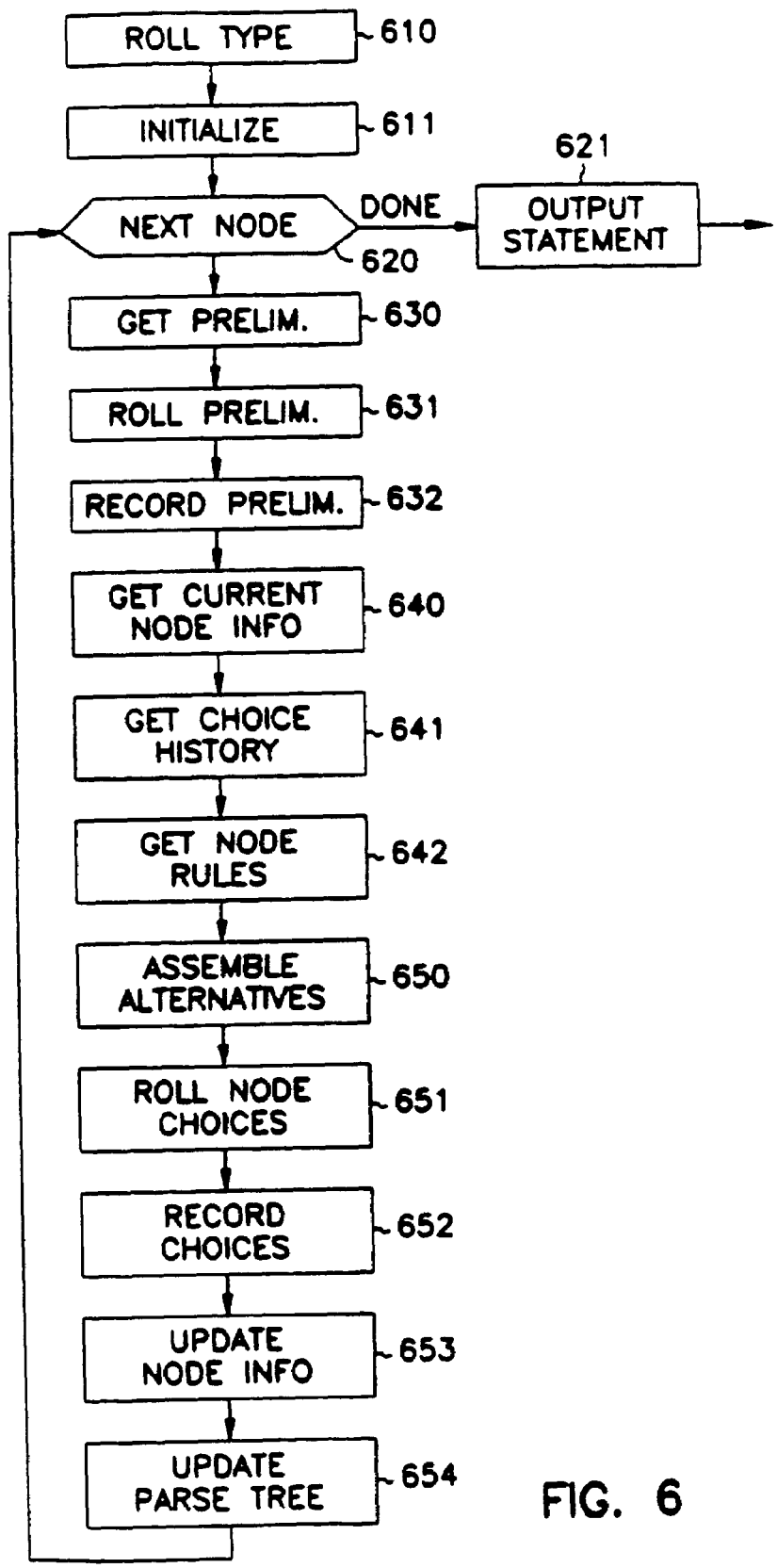
FIG. 6 is a flow diagram detailing the construction of a test statement according to FIG. 3.

FIG. 6 shows a process 600 for constructing a single test statement according to block 320, FIG. 3, by following syntax diagrams stochastically. One may think of constructing a statement as building a parse tree of the statement; however, routine 600 does not produce any explicit representation of a parse tree. In the following description, file term "roll" means to obtain a number from random number generator 321 and use the number to make a choice among alternatives allowed by certain constraints, with probabilities which might be specified by rules, settings, or other sources; it includes situations where the constraints, etc., might allow only a single choice.

First, block 610 rolls to determine the type of statement to be generated. For the SQL query language, the alternatives include SELECT, UPDATE, INSERT, etc. Configuration file 400 lists the desired probabilities of each statement type. Block 611 initializes information described below that is carried along from node to node during the process.

Block 620 follows the syntax diagram of the selected statement. That is, at each activation, it chooses the next syntactical element or set of alternative elements in the diagram as the current node. In diagram 500, for example, block 620 would first choose element 511, then the alternatives presented at point 512, then, depending upon a roll outcome, neither or one of the elements 521 and 525, etc., then onward through diagram 520. Returning to diagram 510, a roll at point 513 sends block 620 through element 520 again, or on to element 514. Some elements might be visited recursively and/or repetitively as block 620 travels upward and downward through the diagrams 500. Block 621 outputs a representation of the statement to program 300 as the statement is generated. If the statement will be executed, block 621 also places a copy in a buffer.

In general, process 600 works on one syntactic element at a time to build one node of the parse tree. At certain places, however, it is necessary to gather preliminary information and to make certain preliminary choices involving elements other than those at the current node in the diagram. For example, the names of the tables to be used in a SELECT query need not be determined syntactically until block 620 reaches element 515 in FIG. 5. However, the choice of columns at previously encountered element 520 could prow3ke inconsistencies with certain constraints, such as parameter values in configuration file 400 or the schema of the database. Therefore, block 630 obtains any preliminary information specified for the current node, block 631 rolls any choices specified by the information, and block 632 records choices that might be useful or might affect choices further along the tree. Continuing the above example, when element 520 becomes the current node in a SELECT statement, block 630 retrieves the list of tables from the schema and the maximum number of tables in a join parameter from configuration file 400. Block 631 chooses a list of particular tables randomly within the parameter limit, and reads the names and data types of all columns belonging to these tables. Block 632 records the names of these columns, because this choice affects the alternatives available to the subsequent element 515, and also to other elements, such as the Column List of GROUP BY clause 517. As an added optimization, block 632 also records the data types of these columns in order to avoid having to look them up again while processing subsequent elements involving functions of those columns.

Block 640 gets information pertaining to the current node that can affect the alternatives available at that node. State information such as the identity of the present element in the syntax diagram obviously affects this choice. Certain parameter values in configuration file 400 might be relevant to the current node; for example, the maximum subquery depth might bar the choice of element 540 at point 531 in FIG. 5, because this element always generates a subquery at element block 510. Some of the preliminary choices might affect the current choices; this includes new information recorded by block 632 for the current node and for any higher node that may affect the current choice. For instance, the preliminary choice of less than all tables, made at element 515, precludes later nodes from choosing columns in other tables of the database schema.

Block 641 presents a cumulative history of previous choices made for any previous nodes in the parse tree. In building a tree by doing a walk of the tree, previous Choices can affect subsequent alternatives at the current node. For example, the data type of an expression is chosen before the expression is generated so the data type information is passed down the tree. This is true even when the alternatives might be syntactically correct; for instance, an ORDER BY entry can be an integer to index the select list but the integer value can not exceed the number of elements in the Select List. The difference between blocks 640 and 641 is that the first restricts alternatives at the current node based upon determinations made for nodes higher (toward the root) in the constructed parse tree, while block 641 carries choices made at lower (toward the leaves) nodes upward to restrict choices when the current node is higher in the tree and choices made at sibling nodes in other subtrees of the parse tree. Stated another way, block 641 concerns all the node choices made up to the current node that are not in the path from the current node to the root. Carrying the results of choices to higher nodes is one of the most important factors in constructing semantically correct test statements for arbitrary databases according to the invention. Without a facility for carrying previous choices upward in the tree, process 600 would have to cleave closely to a predefined fixed database in order to construct statements consistent with the semantics of the database.

Block 642 makes available a set of rules written for particular nodes. These rules are of two types. Mandatory rules require the performance of certain actions. For example, some points in a syntax diagram require that a column reference be generated; thus any potential alternatives at the current node that do not result in a column reference must be excluded. Optional rules permit certain actions. Such a rule might allow the generation of a column reference to a correlated column in a subquery at the current node. Rules can be hard-coded into a program that executes process 600, stored in an external file, or implemented in any other convenient manner.

Block 650 assembles a list of alternatives available at the current node. These alternatives arise from the set of elements specified at the current node of the syntax diagram, and are potentially modified or restricted by some or all of the information obtained in blocks 640–642. Block 651 rolls the assembled alternatives to produce a random choice of a syntactic element for the current node. (As a shorthand notation, the term 'roll' means to choose among a set of alternatives in accordance with a random or pseudorandom number; the probabilities of each alternative can be equal or weighted.) This can include a terminal value; e.g., a roll might produce the numeric value 10000 where the current node requires an item of numeric data. Some of the alternatives might have probabilities or ranges specified by weighting parameters in the configuration file, as mentioned. Although the roll outcome could be derived from a non-predictable random source, such as hashing the time of day, using a pseudo-random roll allows a seed value recorded in the configuration file to reproduce the action of block 651 deterministically if desired for regression testing or other purposes. For degenerate nodes where only one alternative exists, block 651, or blocks 640–650, can be entirely bypassed to save time.

Block 652 records the choices made in the history obtained by block 641. Block 653 updates the information obtained by block 640, based upon the current-node choices. Block 654 updates the statement according to the choices made in block 651. Normally, a choice at each current node adds a term to the statement's parse tree. However', it is sometimes advantageous to delay this action. For example, column references are constructed for a GROUP BY clause 517, FIG. 5, but later choices can generate expressions and intermix them randomly with the column references before outputting the clause as part of a SELECT statement or subquery.

In practice, process 600 can be implemented as a number of individual functions called recursively on a parse tree. As an example, a C function GenSelect ( ) produces a single SQL statement 510 at any level of a parse tree. Briefly, this function first rolls to determine the list of tables in the FROM clause, within the configured limit. If this query must return a particular data type, it checks to ensure that at least one listed table contains a column of that type. Next, the function builds a list of data types for all columns in the selected tables. Another roll determines 'how many elements the select element 520 will contain. The next roll determines whether the query will include a DISTINCT clause, and/or will use the DISTINCT qualifier in aggregate functions. A roll includes or omits a GROUP BY clause, and, in the former case, rolls to build its column references—but does not yet output the clause.

The next step is to output the "SELECT" keyword to the tree, and start following syntax diagram 500. A sequence of rolls generates expressions for syntactic element 520 which are then output. The keyword "FROM" and the list of tables in the FROM clause is then output to the parse tree. If outer joins are configured, a sequence of rolls generates their ON-clause predicates. A roll includes or omits a WHERE clause 516, and performs further rolls to build it. If a predicate involves a subquery, GenSelect ( ) produces certain rules (e.g., return no more than one row of data), and calls itself recursively to build the subquery. The function then produces expressions for the GROUP BY list, and outputs the entire GROUP BY clause. A further roll possibly includes and builds a HAVING clause, building any subqueries and their rules as above. Finally, a roll possibly includes and builds an ORDER BY clause, then rolls to intermix expressions and index references to entries in the Select List.

Another function, GenExpr ( ), builds expressions for GenSelect ( ) and for other functions. It outputs a constant or a column reference, or calls itself recursively to generate operators or functions that take expressions as arguments. While the design of such a function is conventional, this particular expression builder illustrates the use of rules according to the invention. A call to GenExpr( ) includes two parameters. TableInfo holds the names and data types of table columns, as described above. ExprInfo contains the explicit rules that the expression must follow, and includes state information that influences the function's choices for expression terms. FIG. 7 lists the parameters of the ExprInfo rules and their meanings. Element names beginning with 'f' are binary flags. If set, the corresponding rule must be followed The rule element DataType, e.g., is a mandatory rule enforcing a particular data type resulting from the evaluation of the expression, while fLocalFunctions is an optional rule allowing aggregate functions such as AVG( ) for any column contained in a table in the current FROM clause.

Figure 8:
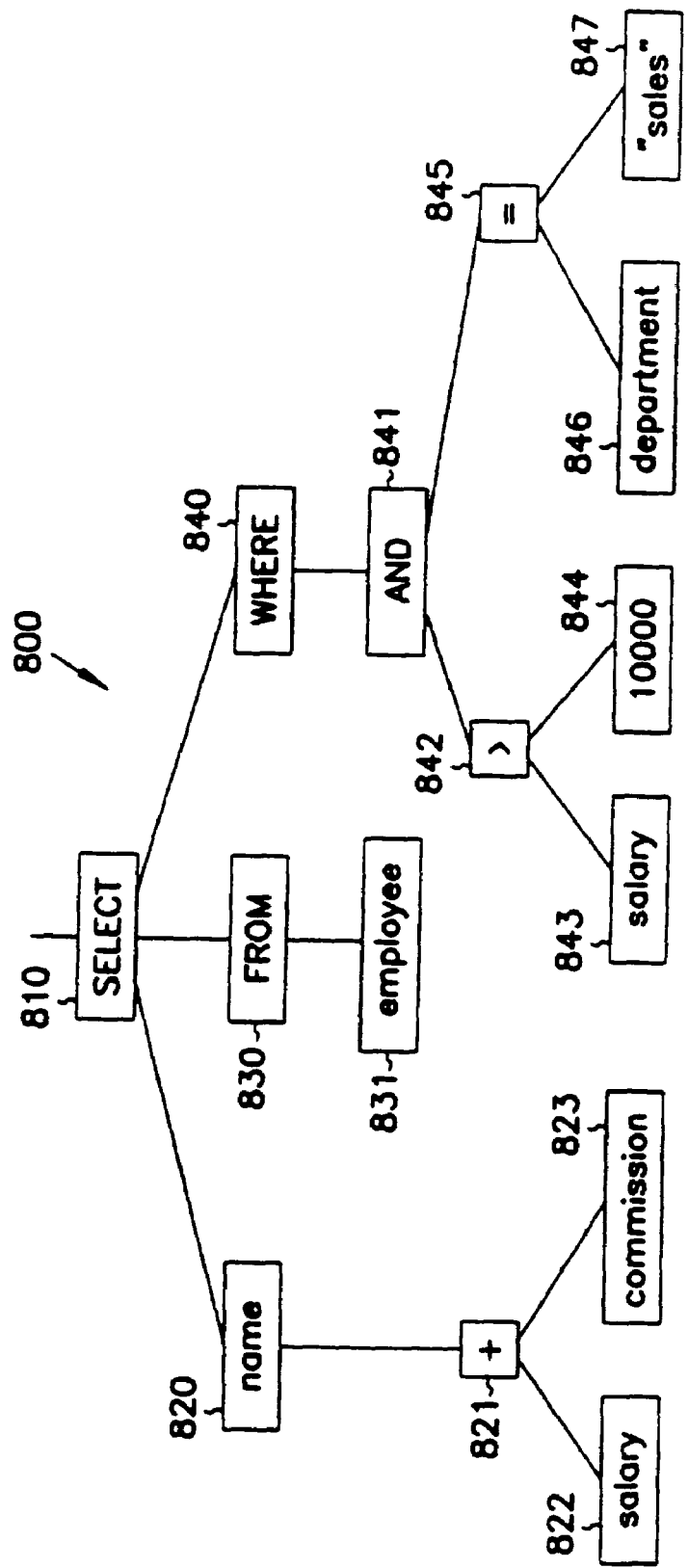
FIG. 8 shows an example of a parse tree for a statement constructed by the process of FIG. 6.

FIG. 8 shows an example of a parse tree 800 for a very short SELECT statement, as generated by process 600. The root of the tree is the SQL keyword "SELECT", 810. The next level of the tree has branches to three nodes. Although block 820 of the select list 520, FIG. 5, is grammatically the first node, process 600 proleptically produces a pool of possible table and column names, as described above. Block 820 specifies that the name column of the database's employee table is the first item in the list. The second item in the Select List is an expression, the sum 821 of columns named salary 822 and commission 823. Nodes 822 and 823 are leaf nodes; that is, their contents specify terminal elements in the syntax of a SELECT statement. The second high-level tree branch leads to node 830, the keyword "FROM" for table list 515. The only table included in this statement is employee, at leaf node 831. Again, process 600 had chosen this table, before actually outputting nodes 820–823; therefore, the column nodes in 820–823 were restricted to be columns of the employee table.

The third high-level branch specifies a WHERE clause at node 840. Nodes 841–847 constitute a predicate generated by a call to a function GenPred( ). Node 841 defines this predicate as a logical AND of two subpredicates. Nodes 842–844, generated by a recursive call to GenPred( ), define the first subexpression as the condition that the value of the salary column exceed the numeric constant 10000. Nodes 843 and 844 are generated by calls to GenExpr( ). The second sub predicate, nodes 845–847, specifies rows of the employee table where the department column contains the string constant "sales". Had the state information produced during the construction of node 831 not noted that at least one of the columns of the chosen employee table has a numeric data type, all arithmetic operators would have been dropped from the list of alternatives during the construction of the expression at nodes 821–823, which would have precluded the choice of addition operator 821. (Relational operator 842 and equality operator 845 are compatible with most data types.)

Process 600 builds statements in the form of parse trees such as 800. However, program 300 normally outputs test statements in the same form that a user or another program would input them to DBMS 240, FIG. 2. Therefore, output block 621 in FIG. 6 outputs each statement as an equivalent character-based representation. Parse tree 800, for example, becomes the statement:

SELECT name, salary+commission
   FROM employee
     WHERE (salary>10000) AND (department='sales')

FIG. 9 shows a more typically complex SQL statement generated by process 600 for a publishing-company database. Statement 900 nests subqueries up to five deep, and the inner queries reference correlated columns in the outer queries. Although some of the requests may seem a bit bizarre (e.g., royalty amounts expressed in radians), the statement syntactically follows the DBMS query language, and the requested data comports semantically with the rules of SQL and with the schema of the target database. Indeed, some of the more prolix constructs, such as adjacent minus signs and redundant parentheses, frequently provoke design errors that more usual statements overlook. One might think that such complex statements would rarely produce any result data at all. Experience has shown, however, that about 50% of non-error SELECT statements generated by process 600 do return at least one row of data. The maximum join size together with the database size and structure (schema) strongly influence the number of returned rows. For large databases, the maximum join size and the maximum subquery depth should be kept low in order to avoid excessive run times and system limits. In a sample test run, ten different clients 120, FIG. 1, concurrently executed 25,000 SQL statements equally distributed over SELECT, INSERT, UPDATE, and DELETE types. Expected errors (mostly deadlocks) occurred in 3,464 statements. Unexpected errors (bugs) having two different error codes occurred in a total of eighteen statements.

Figure 10:
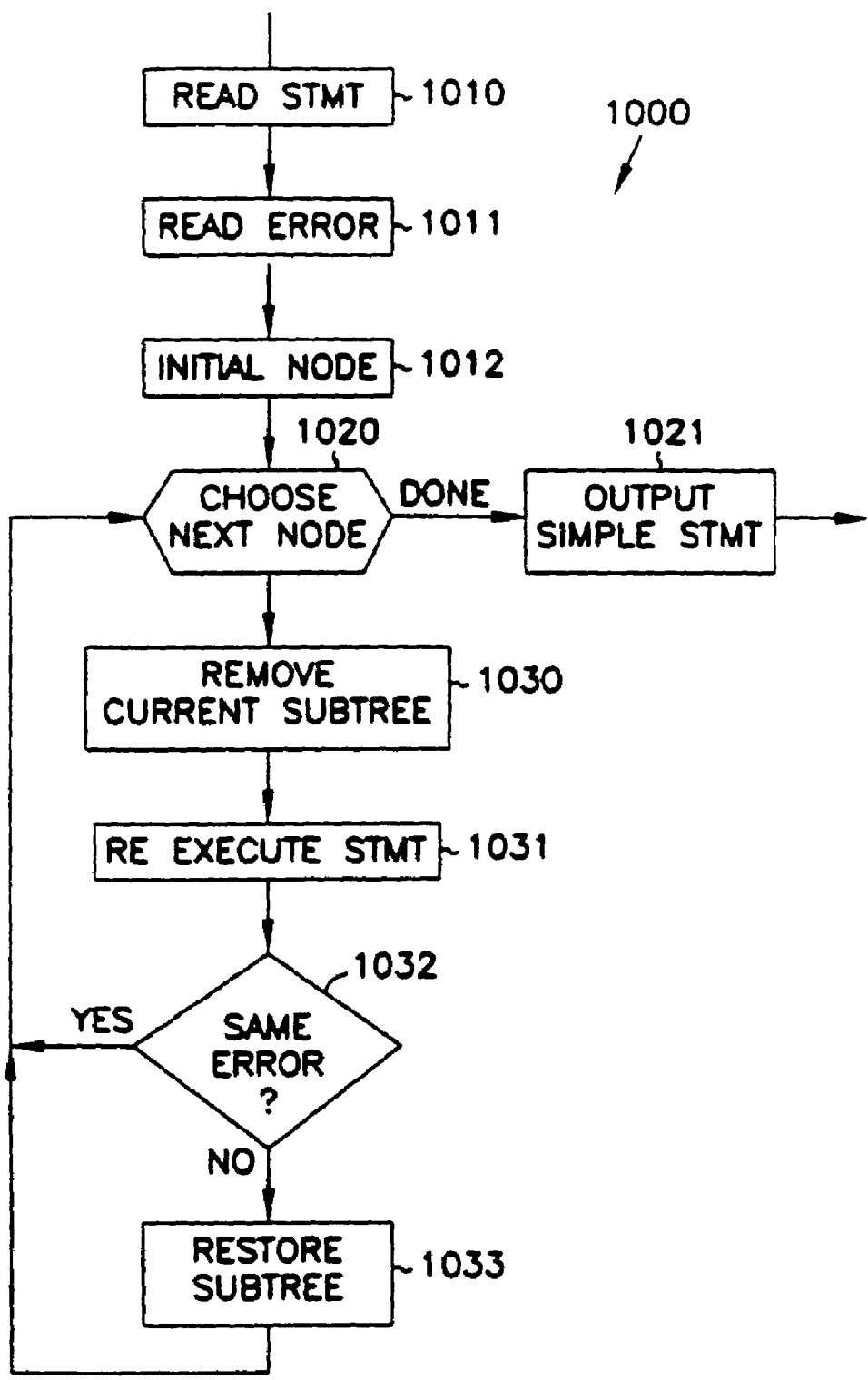
FIG. 10 is a flow diagram for simplifying a faulty statement according to FIG. 3.

FIG. 10 shows a process 1000 for simplifying an error statement (that is, one which has produced an error indicating a fault in DBMS 240) according to block 342, FIG. 3. Because SQL and other query languages are non-procedural, and databases frequently contain gigabytes of data, the query compiler of DBMS 240 attempts to reduce processing time and memory usage with complex access plans involving many steps. Debugging the complex plans step by step is extremely tedious and difficult. Therefore, finding a simple statement having the same error as a much more complex statement aids greatly in isolating the cause of the error.

Block 1010 first reads in the error statement detected by block 341 in the format of a parse tree as shown in FIG. 8. Block 1011 records an indication denoting the particular error that occurred; usually, this is a code produced by search engine 241, although it can also be a signal indicating a connection loss, or some other indication. Block 1012 initializes process 1000 to the root node of the parse tree (e.g., node 810, FIG. 8).

Block 1020 walks the parse tree of the error statement, using any conventional method. Block 1020 chooses certain nodes whose subtree is a candidate for removal. Block 1030 removes the entire subtree of the current node. (For some cases, such as expressions involving two operands such as 'A+B', block 1030 first removes subtree A and also the '+'. Then it removes subtree B and also the '+'.) Block 1031 then reexecutes the truncated statement on the search engine. If the search engine returns the same error indication, block 1032 passes control to block 1020 to determine whether this truncated statement can be further simplified by removing additional subtrees. If the reexecution results in no error code, or in a different error code, block 1033 restores the subtree removed by block 1030 before passing control back to block 1020. When block 1020 has visited all branches of the parse tree, block 1021 translates the truncated tree into the form of a simplified statement and outputs it to block 344, FIG. 3.

Using the example in FIG. 8, block 1020 first visits the branch to node 820, to remove the subtree including nodes 820–823, then the branch to node 821, to remove nodes 822–823, then to remove 822 alone, then to 823 alone. Next, the branch to node 830 is removed, and that subtree is followed to its leaf 831. Finally, the branch to node 840 is removed, and its subtree is visited. Although the parse tree of the original statement could be processed in the opposite direction, walking the branches from the root node toward the leaf nodes removes the highest possible subtrees first, thus isolating the miscreant subtree more quickly. Also, block 1020 need not attempt to remove each possible subtree of the parse tree. For example, removing the entire subtree 820–823 would result in a simplified statement having incorrect syntax, because the entire select list would be missing from the SELECT statement. Block 1032 would then reject the resulting syntax-error code, causing block 1033 to restore the subtree. Removing the subtree containing nodes 821–823, however, leaves the statement in a syntactically correct form. (FIG. 8 has been simplified for this short example. For more complex statements, removing a subtree does not remove a suffix of the Select List. Select List entries are not removed, but rather only elements of their expressions. In expressions with two operands, the operator is removed along with the subtree of one of the operands.)

A more intelligent block 1020 understands at least some of the formalities of the target query language, and passes over branches which are known to be syntactically required or to possess other properties rendering them unsuitable for deletion. A number of heuristic optimizations have been incorporated into the statement simplifier. For example, it performs trial deletes from the top of the tree down; this alone eliminates the processing of most of the subtrees. The simplifier does not try all possible deletions. For example, it does not lop items from the Select List or from the ORDER BY list. It does not always plumb the deepest level. It never back-tracks. Once it tries a delete and finds it doesn't work, it never tries the same delete again, although there are cases where other successful deletes enable a previously tried one.

FIG. 11 shows a simplified statement generated from the statement of FIG. 8 by process 1000. Such drastic parings of the parse tree are not uncommon. Modifying elements of the simplified statement for further fault isolation is now feasible, whereas modifying portions of the full statement of FIG. 4 would be a daunting task.

The above-described systems and methods provide a fast and efficient mechanism to generate SQL statements that can be used to test database software. In some embodiments of the invention, the SQL statements generated using the systems and processes described above are created using a tight join. As is known in the art, an SQL join is the combining of two (or more) SQL tables, often with a predicate that relates rows in different SQL tables. For example, suppose SQL table Employee has columns Name, DeptNumber, and Salary and contains 1000 rows. Also suppose that SQL table Department has columns DeptNumber, DeptName, Manager, and Location and contains 100 rows. The SQL query Q1:

Select Employee.Name, Employee.Salary, Department.Location

From Employee, Department     (Q1)

is an example of a join of the Employee and Department tables. The result of executing the above query is a table with 3 columns and 100,000 rows representing all combinations (1000×100) of rows in both tables. The result table is the size of the Cartesian product table. In joins of tables where each table has many rows, the Cartesian product can grow quite large, and it can take a large amount of time to return the complete result set.

If a predicate is added to the query to limit the result set to those rows where there is a match on Employee and Department rows corresponding to the same department, then the result table will have at most 1000 rows in it with each row corresponding to one employee. The query Q2 below illustrates such a query:

Select Employee.Name, Employee.Salary, Department.Location

From Employee, Department

Where
    Employee.DeptNumber=Department.DeptNumber    (Q2)

The query in Q2 filters the results to exclude those employees with a DeptNumber value that does not match a value in Department. The query in Q2 is thus an example of a tight join: the two tables in the From list of the query are joined with a tight join predicate of the form Table1.Column1=Table2.Column2. Further "ANDing" of predicates results in an even more restrictive join with correspondingly fewer rows returned in the results set. The query in Q3 is an example of adding further predicates to further filter the results set:

Select Employee.Name, Employee.Salary, Department.Location

From Employee, Department

Where (Employee. Salary>10000 or Employee.Name< >Department. Location)

AND Employee. DeptNumber=Department. DeptNumber    (Q3)

Figure 12:
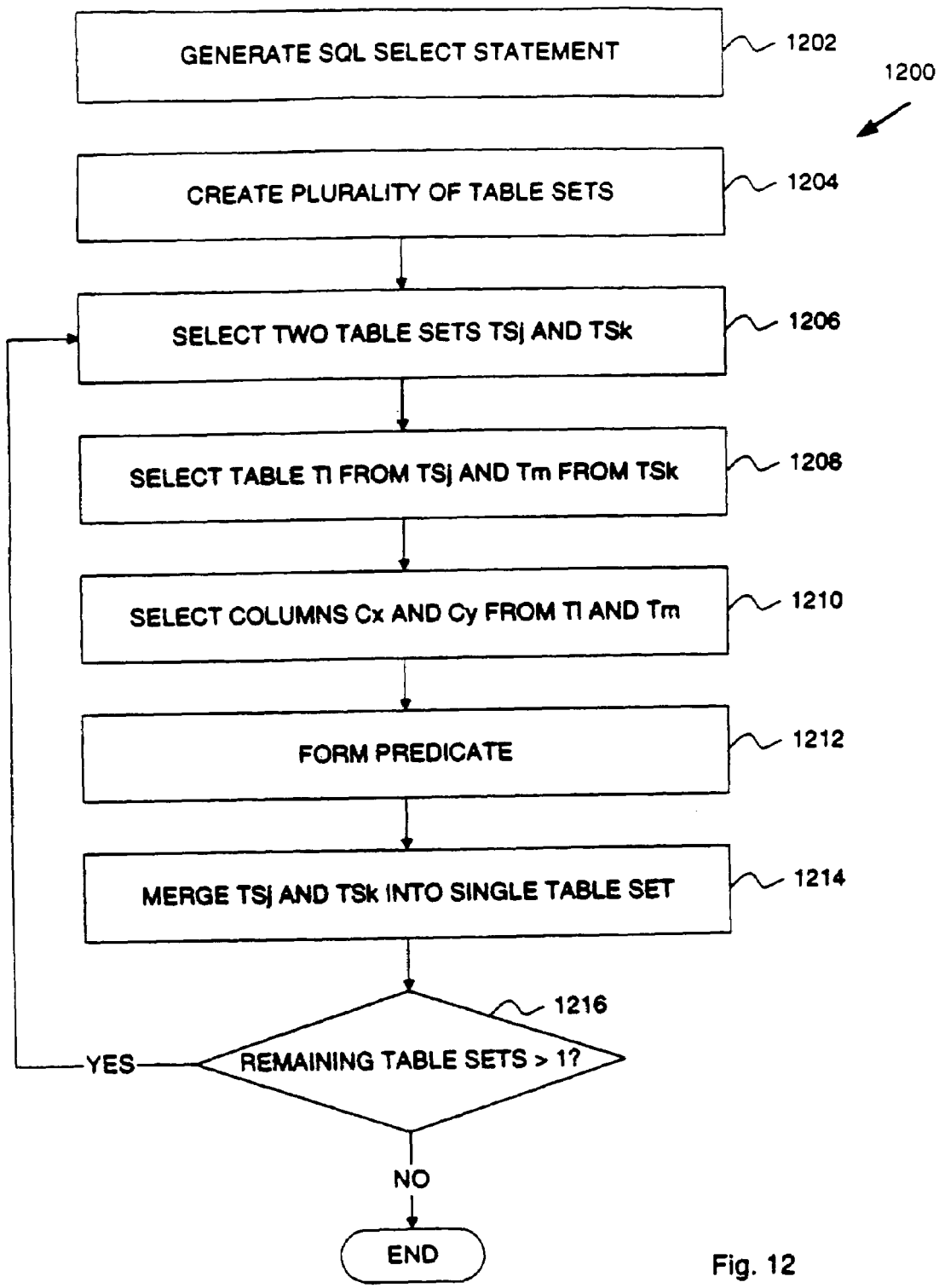
FIG. 12 is a flow diagram for providing a tight join for test statements produced by the process of FIG. 6.

FIG. 12 is a flow diagram of a process 1200 for providing a tight join for test statements produced by the systems and processes described above in reference to FIGS. 1–11. The process begins at block 1202, where a SQL Select statement is generated as described above. The Select statement will have a list of N tables in the From list. Note that if N=1, the process exits, as there can be no join formed based on a single table.

At block 1204, a plurality of table sets is created, where each table set initially contains one table in the From list. Thus initially, the I-th table set will contain the I-th table in the From list.

Next, at block 1206, a pair of table set TSj and TSk are selected from the plurality of table sets. In some embodiments, the table set pairs are selected uniformly, that is, randomly. As those of skill in the art will appreciate, other selection algorithms can be used. For example, the least recently used table set could be selected. The invention is not limited to any particular mechanism for selecting a table set pair.

Then, at block 1208, a table Tl and Tm are selected from table sets TSj and TSk respectively. As the process iterates, the table sets will contain more and more tables. In some embodiments of the invention, the selection of a particular table from a table set is uniform. In alternative embodiments, the tables are selected using other algorithms known to those of skill in the art.

At block 1210, columns Cx and Cy are selected from tables Tl and Tm respectively. In one embodiment of the invention, the columns are selected uniformly. In an alternative embodiment, the columns are selected according to whether they have a compatible data type such that they can be logically compared with little or no type conversion (i.e. conversion of a numeric to a character string or vice versa). In a further alternative embodiment, a list of column pairs that have the same or similar column names is created. A column pair can be considered similar if the pair has a common prefix or suffix, are phonetically similar, or exhibit a common pattern. A column pair is then chosen uniformly from the list of similar column pairs. Selection of similar column names is desirable, because it is often the case that similar column names represent foreign keys relating on table to another, and thus emulates the manner in which select statements will be used by actual customers.

After the columns have been selected, at block 1212 a predicate is formed using the two column names. The main implementation is for the predicate to perform a logical comparison to determine if the data value for column Cx is equal to that for column Cy, but other types of comparisons are possible that preclude Cartesian products. The predicate is "ANDed" into the existing Where clause for the SQL statement.

At block 1214, the tables in table sets TSj and TSk are merged into a single table set, and TSj and TSk are deleted. A decision block 1216 determines if more than one table set remains after the merging. If so, the process proceeds to block 1206 to repeat the predicate creation process. If not, the Where clause is complete and the process ends. The Where clause that is generated represents a tight join of the tables in the From clause, and restricts the results set such that a Cartesian product of the rows in the tables is avoided.

FIG. 13 provides an exemplary scenario of the application of the process described in FIG. 12, in which a SQL Select statement is transformed to include a Tight join. In the example, the original query 1302.0 is shown in along with an initial five table sets 1304.0 each containing one table from the From list. In the first iteration of process 1200 above, table sets {T3} and {T5} are used to form the predicate T3.c=T5.c, which is added to form SQL statement 1302.1. Table sets {T3} and {T5} are merged into a single table set {T3,T5} resulting in table set 1304.1. Each iteration of process 1200 reduces the number of table sets 1304.2–1304.4 by one until only one table set 1304.4 remains. The SQL statements that are created in each iteration are represented in 1302.2–1302.4

It should be noted that the examples presented above illustrate a top-level Select statement with a From clause consisting of simple tables. However, the invention is not so limited. The Tight Join process can also applied in exactly the same way to other scenarios. For example, the Select statement may be in a subquery. Alternatively, the tables in the From list of the Select statement do not have to be real tables or views, they can also be Outer Join clauses. For example assume that the database also has a Company table with columns CompName, President, City, and State; and the Department table has an added CompName column. Query Q4, derived from query Q3, illustrates adding a Tight Join predicate.

Select Employee.Name, Employee.Salary, Department.Location, Company.State

From Employee, Department Outer Left Join Company ON

Department.CompName=Company.CompName

Where (Employee.Salary>10000 or Employee.Name< >Department.Location)

AND
    Employee.DeptNumber=Department.DeptNumber

Note that the Outer Joins can nest, each of the two table arguments can be a base table or view or an Outer join. In all cases, a table set represents the tables in the left argument and another table set represents the tables in the right argument. A table from each set is chosen to supply the column for the fight join predicate and the union of the table sets forms the table set for the encompassing Outer Join.

In addition, the tight join process described above can be applied to statements other than the Select statement. For example, Delete statements and Update statements can also contain predicates created using the tight join process.

Further embodiments of the invention include processes that create predicates involving test strings. Many database management systems, including Microsoft SQL Server have a 'Full Text' feature where large text strings in the database can be searched with special predicates pertaining to text search. For example, suppose an Articles table has columns ArticleName, Reporter. Date, and Text to hold a large number of Newspaper articles The Text column holds the entire text of the article. Query Q5 is an example of a query that can be formed for the example database:

Select ArticleName, Date

From Articles

Where CONTAINS(Text, 'cherry NEAR pie')  (Q5)

Q5 thus returns the names and dates of all articles that contain the word 'cherry' somewhere near the word 'pie' (perhaps in the same or adjacent sentences). In Q5, 'cherry' and 'pie' are character string constants and NEAR is a keyword supported by the database management system. The automated SQL testing tool can generate a query like Q5, but the character string constants would he random length strings of random characters. With rare exceptions these randomly generated constants do not exist as text words in real databases. This causes almost all uses of CONTAINS and other full text predicates to fail, which results in under-exercise of some code paths.

Figure 14:
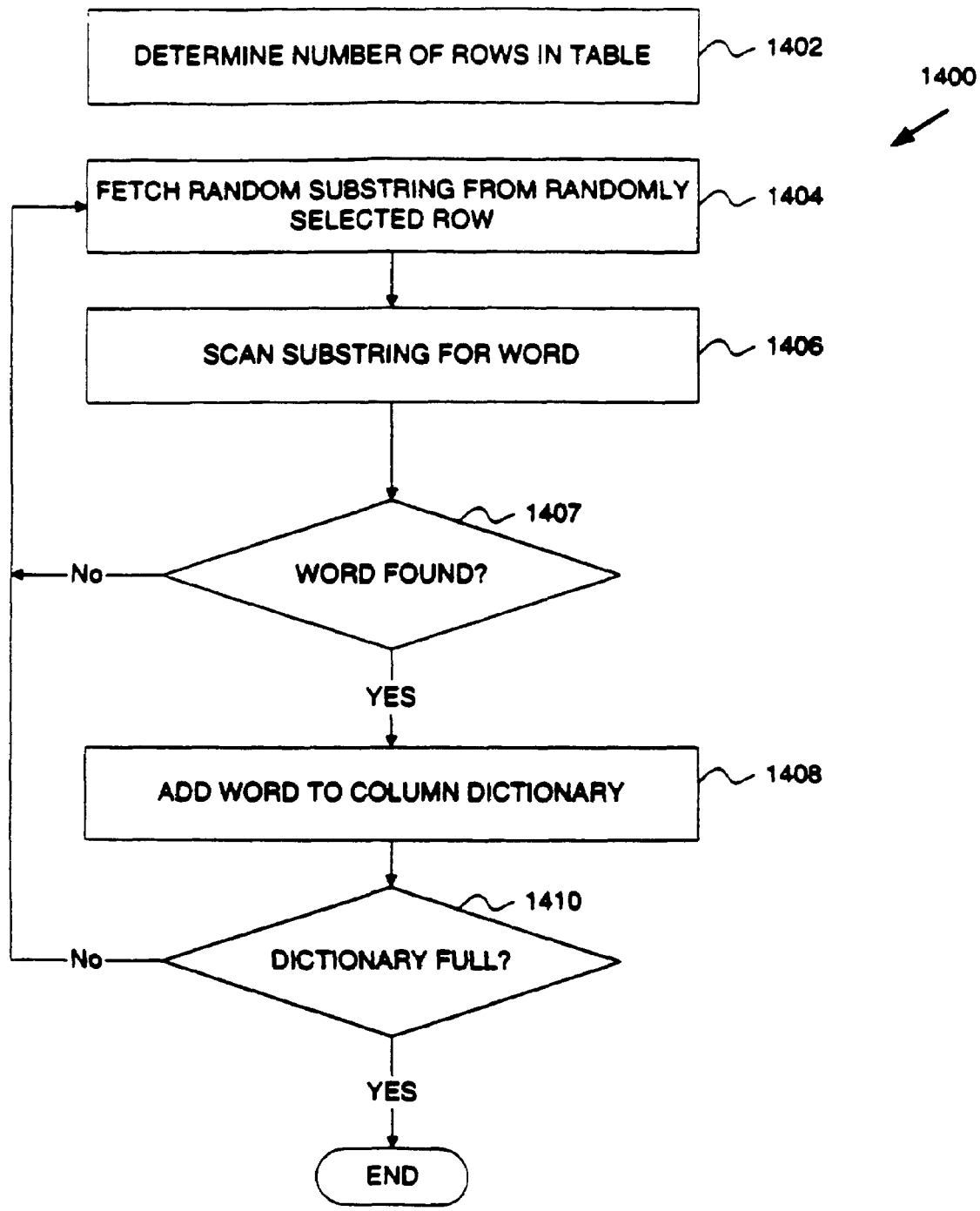
FIG. 14 is a flow diagram for generating text strings for statements produced by the process of FIG. 6.

FIG. 14 is a flow diagram for generating a sample dictionary of real words from a text column in the database. The dictionary is then used to help generate text strings for statements produced by the process of FIG. 6. A word dictionary is added as a choice in block 650, when a character string constant is generated. First, at block 1402, the process determines the total number of rows, "Num-Rows," in the table containing the text column. This parameter can be used to determine how many words (NumWords) should be inserted into a dictionary. NumWords can be determined as an percentage of NumRows, it can be hard coded, or it can be determined in other manners. The invention is not limited to any particular method of determining the number of words to be inserted into the dictionary.

Next, at block 1404 the process fetches a random substring from the text column in a randomly selected row. In one embodiment of the invention, a SQL statement of the form 'Select SUBSTRING(TextCol, Rand0*Len(TextCol), SubLen) from Table Where KeyCol=Rand( )*NumRows. Rand( ) is a random number generator returning values uniformly distributed between 0 and 1. SubLen is the length of the substring retrieved and its value is configurable. In one embodiment, 64 is a used as a starting value, however the invention is not limited to any particular value for Sub Len. KeyCol represents a key column of the table.

Then at block 1406 the string returned at block 1404 is scanned from left to right looking for a word. In one embodiment, each character is scanned from the left to look for the beginning of a word. Blanks are ignored until a nonblank is found (at char cStart). The scan continues until a blank or punctuation character is found (at char cEnd). At block 1407, if no word is found the method returns to block 1404.

Next, at block 1408, the process select the characters between cStart and (cEnd-1) as a word and adds it to the Dictionary. At block 1410 a check is made to determine if the dictionary is full (i.e. have NumWords words been inserted). If so, the method terminates, otherwise the method returns to block 1404.

The process makes random probes to obtain words for the dictionary for use in predicates involving text strings. In one embodiment of the invention, column KeyCol has values 0,1, . . . NumRows. In alternative embodiments, the predicate can be "KeyCol>=MinKey+Rand0*(MaxKey-MinKey) where MinKey and MaxKey denote the minimum and maximum values of the key, respectively.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, while the embodiments of the invention have been described as executing within a test environment for a relational database management system. The systems and methods of the invention could be applied to object oriented database using Object Query Langauges (OQL) as well.

The terminology used in this application is meant to include all of these environments. Therefore, it is manifestly intended that this invention be limited only by the following claims and equivalents thereof.

I claim:

1. A computer-implemented system for creating a SQL statement, the system comprising:
 means for generating a SQL statement having a from clause, the from clause include a plurality of table names;
 means for creating a plurality of table sets from the plurality of table names;
 means for iterating of the plurality of table sets until one table set remains and for each iteration performing the tasks of:
 means for selecting a first table set and a second table set from the plurality of table sets;
 means for selecting a first table from the first table set and selecting a second table from the second table set;
 means for selecting a first colunm in the first table and selecting a second colunm from the second table;
 means for inserting into a where clause for the SQL statement a predicate including the first column and the second column; and
 means for merging the first table set and the second table set.

2. The system of claim 1, further comprising means for deleting the first table set and the second table set after merging.

3. The system of claim 1, wherein the first table set and the second table set are uniformly selected.

4. The system of claim 1, wherein the first table and the second table are uniformly selected.

5. The system of claim 1, wherein the first column and the second column are uniformly selected.

6. The system of claim 1, wherein the first column and the second column are selected based on a compatibility of a data type of the first column and a data type of the second column.

7. The system of claim 1, wherein the first column and the second column are selected based on a substantial similarity between a column name of the first column and a column name of the second column.

8. The system of claim 7, wherein the substantial similarity is between a prefix of the column name of the first column and a prefix of the column name of the second column.

9. The methed system of claim 7, wherein the substantial similarity is between a suffix of the column name of the first column and a suffix of the column name of the second column.

10. A system for performing a method for creating a SQL statement, comprising:
- a plurality of table names;
- a SQL statement having a from clause, the from clause including the plurality of table names;
- a plurality of table sets created from the plurality of table names, wherein the plurality of table sets are iterated until one table set remains and for each iteration;
- a first table set and a second table set selected from the plurality of table sets;
- a first table selected from the first table set;
- a second table selected from the second table set;
- a first column selected from the first table; and
- a second column selected from the second table, wherein a predicate is inserted into a where clause for the SQL statement, and wherein the predicate includes the first column and the second column, and wherein the first table set and the second table set are merged.

11. The system of claim 10, wherein the first table set and the second table set are deleted after merging.

12. The system of claim 10, wherein the first table set and the second table set are uniformly selected.

13. The system of claim 10, wherein the first table and the second table are uniformly selected.

14. The system of claim 10, wherein the first column and the second column are uniformly selected.

15. The system of claim 10, wherein the first column and the second column are selected based on a compatibility of a data type of the first column and a data type of the second column.

16. The system of claim 10, wherein the first column and the second column are selected based on a substantial similarity between a column name of the first column and a column name of the second column.

17. The system of claim 10, wherein the substantial similarity is between a prefix of the column name of the first column and a prefix of the column name of the second column.

18. The system of claim 10, wherein the substantial similarity is between a suffix of the column name of the first column and a suffix of the column name of the second column.

* * * * *